United States Patent
Chen et al.

(10) Patent No.: US 12,088,566 B2
(45) Date of Patent: Sep. 10, 2024

(54) USER INVITING METHOD AND APPARATUS, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Chunyong Chen, Shenzhen (CN); Lin Yang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 345 days.

(21) Appl. No.: 17/710,034

(22) Filed: Mar. 31, 2022

(65) Prior Publication Data

US 2022/0224677 A1  Jul. 14, 2022

Related U.S. Application Data

(63) Continuation of application No. PCT/CN2021/078467, filed on Mar. 1, 2021.

(30) Foreign Application Priority Data

Apr. 15, 2020 (CN) .......................... 202010296248.2

(51) Int. Cl.
*H04L 9/40* (2022.01)
*G06F 16/955* (2019.01)
(Continued)

(52) U.S. Cl.
CPC ........ *H04L 63/0435* (2013.01); *G06F 16/955* (2019.01); *H04L 9/0822* (2013.01);
(Continued)

(58) Field of Classification Search
CPC . H04L 63/0435; H04L 9/0822; H04L 9/3226; H04L 63/067; H04L 63/08; G06F 16/955
(Continued)

(56) References Cited

U.S. PATENT DOCUMENTS

| | | | |
|---|---|---|---|
| 2005/0038872 A1* | 2/2005 | Ono ................... | G06K 7/10722 707/E17.112 |
| 2010/0023757 A1* | 1/2010 | Nguyen-Huu ........ | H04L 9/3263 380/282 |

(Continued)

FOREIGN PATENT DOCUMENTS

| | | |
|---|---|---|
| CN | 104796380 A | 7/2015 |
| CN | 110086625 A | 8/2019 |

(Continued)

OTHER PUBLICATIONS

The Japan Patent Office (JPO) Notification of Reasons for Refusal for Application No. 2022-533401 and Translation Jun. 28, 2023 7 Pages.
(Continued)

*Primary Examiner* — Thanh T Le
(74) *Attorney, Agent, or Firm* — ANOVA LAW GROUP PLLC

(57) ABSTRACT

A user inviting method includes: obtaining a user identifier of a current login user, in response to a trigger operation for a target invitation link corresponding to a target two-dimensional code, the target two-dimensional code being encrypted by using a public key and used for indicating jump to a target invitation page; accessing the target invitation link based on the user identifier, and obtaining a private key corresponding to the public key in response to that the user identifier is consistent with a target user identifier corresponding to the target invitation link; decrypting the target two-dimensional code by using the private key, and displaying the target invitation page in response to that the target
(Continued)

two-dimensional code is decrypted successfully; and submitting user information written to the target invitation page in response to a submitting operation for the target invitation page.

20 Claims, 14 Drawing Sheets

(51) Int. Cl.
*H04L 9/08* (2006.01)
*H04L 9/32* (2006.01)
(52) U.S. Cl.
CPC .......... *H04L 9/3226* (2013.01); *H04L 63/067* (2013.01); *H04L 63/08* (2013.01)
(58) Field of Classification Search
USPC ........................................................ 713/168
See application file for complete search history.

(56) References Cited

U.S. PATENT DOCUMENTS

| | | | | |
|---|---|---|---|---|
| 2013/0111208 | A1* | 5/2013 | Sabin | G06F 21/36 713/176 |
| 2014/0112551 | A1 | 4/2014 | Terwilliger et al. | |
| 2015/0269620 | A1* | 9/2015 | Burger | G06Q 30/0269 705/14.55 |
| 2015/0288701 | A1* | 10/2015 | Brand | G06F 21/33 726/7 |
| 2016/0087949 | A1* | 3/2016 | Deleeuw | H04W 12/50 713/170 |
| 2016/0140570 | A1 | 5/2016 | Rivlin et al. | |
| 2016/0277381 | A1 | 9/2016 | Yuan et al. | |
| 2017/0324729 | A1* | 11/2017 | Hon | H04L 63/083 |
| 2018/0144421 | A1* | 5/2018 | Williams | G06Q 50/18 |
| 2018/0152290 | A1* | 5/2018 | Jiang | H04L 9/08 |
| 2019/0075456 | A1* | 3/2019 | Evans | G09C 5/00 |
| 2020/0344046 | A1* | 10/2020 | Lindeman | H04L 9/3218 |
| 2020/0387621 | A1* | 12/2020 | Chen | G06F 16/1824 |
| 2021/0374219 | A1* | 12/2021 | Suwa | G06F 21/32 |
| 2022/0122066 | A1* | 4/2022 | Du | H04L 9/0822 |
| 2022/0230204 | A1* | 7/2022 | Cassidy | G06Q 30/0261 |

FOREIGN PATENT DOCUMENTS

| | | |
|---|---|---|
| CN | 110648413 A | 1/2020 |
| CN | 111506884 A | 8/2020 |
| JP | 2003233546 A | 8/2003 |
| JP | 2008200062 A | 9/2008 |
| JP | 2009026034 A | 2/2009 |
| JP | 2010250661 A | 11/2010 |
| JP | 2020046925 A | 3/2020 |

OTHER PUBLICATIONS

The World Intellectual Property Organization (WIPO) International Search Report for PCT/CN2021/078467 May 26, 2021 6 Pages (including translation).

* cited by examiner

USER INVITING METHOD AND APPARATUS, COMPUTER DEVICE, AND COMPUTER-READABLE STORAGE MEDIUM

RELATED APPLICATION(S)

This application is a continuation application of PCT Patent Application No. PCT/CN2021/078467 filed on Mar. 1, 2021, which claims priority to Chinese Patent Application No. 202010296248.2 filed on Apr. 15, 2020 with the National Intellectual Property Administration, PRC, all of which are incorporated herein by reference in entirety.

FIELD OF THE TECHNOLOGY

The present disclosure relates to the field of Internet technologies, and in particular, to a user inviting method and apparatus, a computer device, and a computer-readable storage medium.

BACKGROUND

With the Internet technologies, information may be transmitted through two-dimensional codes. When inviting users, information for inviting users may be transmitted through a two-dimensional code, to invite the users to join a group. The invited users may join the group by scanning the two-dimensional code. However, after the two-dimensional code is shared, the two-dimensional code may be forwarded for infinite times, and the spreading range of the two-dimensional code may not be controlled. Each user who obtains the two-dimensional code may obtain information in the two-dimensional code by scanning the two-dimensional code. In other words, each user who obtains the two-dimensional code may respond to user invitation. As a result, the invitation initiating user cannot control the range of reach of the user's invitation. The method for inviting users through the two-dimensional code in certain existing technologies may run into a risk of fraudulent use of the two-dimensional code and a low security of two-dimensional code data.

SUMMARY

Embodiments of the present disclosure provide a user inviting method and apparatus, a computer device, and a computer-readable storage medium, which can avoid fraudulent use of a two-dimensional code, to ensure the security of two-dimensional code data.

In one aspect, the present disclosure provides a user inviting method, performed by a terminal, the method including: obtaining a user identifier of a current login user, in response to a trigger operation for a target invitation link corresponding to a target two-dimensional code, where the target two-dimensional code is encrypted by using a public key and used for indicating jump to a target invitation page; accessing the target invitation link based on the user identifier, and obtaining a private key corresponding to the public key in response to that the user identifier is consistent with a target user identifier corresponding to the target invitation link; decrypting the target two-dimensional code by using the private key, and displaying the target invitation page in response to that the target two-dimensional code is decrypted successfully; and submitting user information written to the target invitation page in response to a submitting operation for the target invitation page.

In another aspect, the present disclosure provides a user inviting method, performed by a server, the method including: transmitting a target invitation link corresponding to a target two-dimensional code, the target two-dimensional code being encrypted by using a public key and used for indicating jump to a target invitation page; receiving an access request for the target invitation link, the access request carrying a user identifier; transmitting a private key corresponding to the public key in response to that the user identifier is consistent with a target user identifier corresponding to the target invitation link, where the private key is used for decrypting the target two-dimensional code, to display the target invitation page in response to that the target two-dimensional code is decrypted successfully; obtaining user information written to the target invitation page in response to a submitting request for the target invitation page; and storing the user information in a blockchain based on a consensus mechanism.

In yet another aspect, the present disclosure provides a user inviting apparatus, comprising: a memory storing computer program instructions; and a processor coupled to the memory and configured to execute the computer program instructions and perform: obtaining a user identifier of a current login user, in response to a trigger operation for a target invitation link corresponding to a target two-dimensional code, the target two-dimensional code being encrypted by using a public key and used for indicating jump to a target invitation page; accessing the target invitation link based on the user identifier, and obtaining a private key corresponding to the public key in response to that the user identifier is consistent with a target user identifier corresponding to the target invitation link; decrypting the target two-dimensional code by using the private key, and displaying the target invitation page in response to that the target two-dimensional code is decrypted successfully; and submitting user information written to the target invitation page in response to a submitting operation for the target invitation page.

In yet another aspect, the present disclosure provides a non-transitory computer-readable storage medium storing computer program instructions executable by at least one processor to perform: obtaining a user identifier of a current login user, in response to a trigger operation for a target invitation link corresponding to a target two-dimensional code, the target two-dimensional code being encrypted by using a public key and used for indicating jump to a target invitation page; accessing the target invitation link based on the user identifier, and obtaining a private key corresponding to the public key in response to that the user identifier is consistent with a target user identifier corresponding to the target invitation link; decrypting the target two-dimensional code by using the private key, and displaying the target invitation page in response to that the target two-dimensional code is decrypted successfully; and submitting user information written to the target invitation page in response to a submitting operation for the target invitation page.

By using the user inviting method and apparatus, the computer device, and the computer-readable storage medium that are provided in the embodiments of the present disclosure, the user identifier of the current login user of the terminal is provided in response to that the target invitation link is accessed by receiving the target invitation link, to determine whether the current login user is an invited user. If the current login user is the invited user, a private key of the target two-dimensional code corresponding to the target invitation link is obtained from the server, and the private key is used for decrypting a target two-dimensional code encrypted through the public key. In response to that the target two-dimensional code is decrypted successfully, a target invitation page indicated by the target two-dimensional code is displayed. User information written to the target invitation page is submitted to the server in response to a submitting operation for the target invitation page. In this way, through encryption of the target two-dimensional code, only the invited user may obtain the private key of the target two-dimensional code, and then may decrypt the target two-dimensional code, to ensure the security of the information of the two-dimensional code and avoid fraudulent use of the two-dimensional code.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

Figure 1:
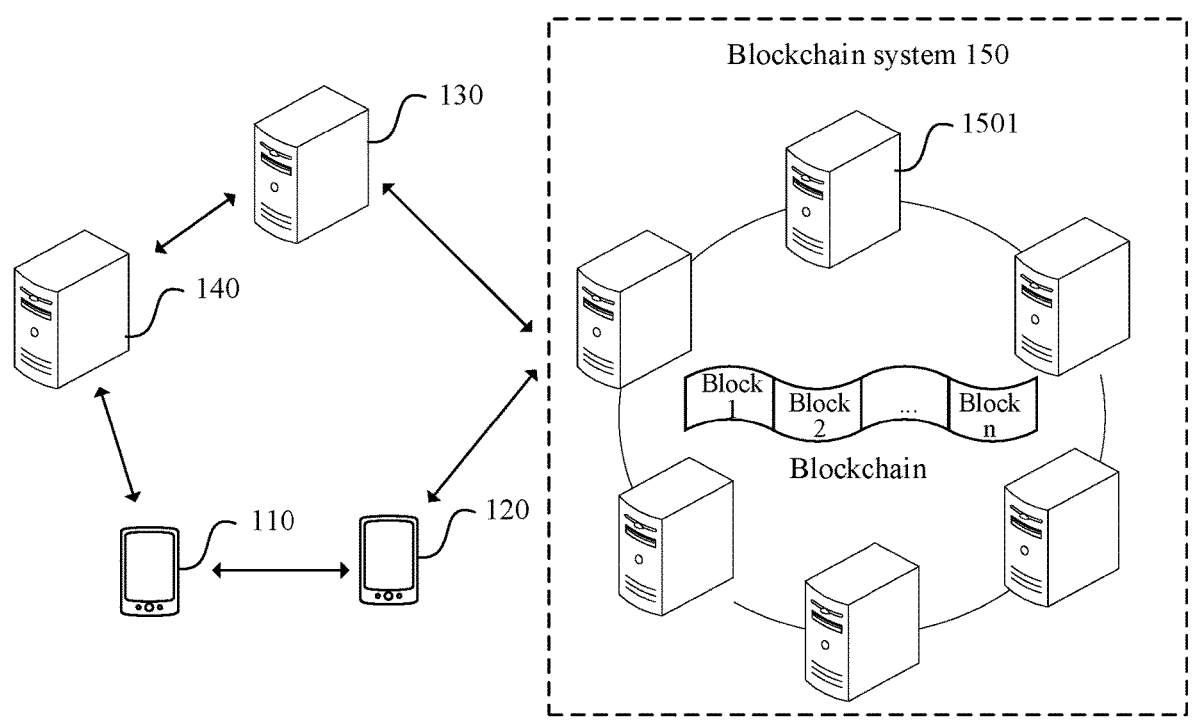
FIG. 1 is a schematic diagram of an implementation environment of a user inviting method according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

For ease of understanding the technical solutions in the embodiments of the present disclosure, some terms involved in the embodiments of the present disclosure are explained below.

Blockchain: a new application mode of computer technologies such as distributed data storage, peer-to-peer transmission, a consensus mechanism, and an encryption algorithm. The blockchain is essentially a decentralized database and is a string of data blocks generated through association by using a cryptographic method. Each data block includes information of a network transaction, the information being used for verifying the validity of information of the data block (anti-counterfeiting) and generating a next block. Each block includes a timestamp and a link with a previous block. In the narrow sense, a blockchain is a chain data structure formed by combining data blocks according to a time sequence in a sequential connection manner, and a non-tamperable and unforgeable distributed ledger ensured in a cryptography manner, that is, the recorded data in the blockchain is irreversible.

Consensus mechanism: a mathematical algorithm for building trust and obtaining rights and interests between different nodes in a blockchain system. In a blockchain system, a transaction can be verified and confirmed in a short time through voting of special nodes. For a transaction, if several nodes that are irrelevant to each other in terms of interests can reach a consensus, it can be considered that some or all nodes in the system can also reach a consensus.

Public key and private key: a key pair (that is, one public key and one private key) obtained by using an algorithm. The public key is a public part in the key pair, and the private key is a non-public part in the key pair. The public key is usually used for encrypting a session key and verifying a digital signature, or encrypting data that may be decrypted by using a corresponding private key. It can be ensured that the key pair obtained by the algorithm is unique. Using the key pair can implement asymmetric encryption, that is, if one key of the key pair is used for encrypting a piece of data, the other key may be used for decrypting the data. For example, data encrypted by using the public key may be decrypted by using the private key. If data is encrypted by using the private key, the data may be decrypted by using the public key. Otherwise, the decryption is not successful.

Hash table: a data structure accessed directly based on a key value, that is, a key element. In other words, the key value may be mapped to a location in the table and then data of the location is accessed directly, to search for the data faster.

The technical solutions provided in the embodiments of the present disclosure may be applied to a plurality of scenarios for inviting users and combined with a plurality of fields. In some embodiments, the solution may be combined with the field of live broadcast. For example, in the field of live broadcast, in response to that a service provider invites users or merchants that have good qualifications to settle in the live broadcast platform, the user inviting method provided in the present disclosure may be applied. In response to that the service provider shares a two-dimensional code that carries invitation information to the invited target users, the public key in the key pair is used for encrypting the two-dimensional code. Only the invited target users may obtain a private key corresponding to the two-dimensional code, and then decrypt the two-dimensional code to obtain the information of the two-dimensional code. The user inviting method provided in the present disclosure may avoid fraudulent use of the two-dimensional code by other users, prevent unqualified users from settling in the live broadcast platform, and ensure user quality of the live broadcast platform. In certain embodiment(s), the user inviting method provided in the present disclosure may be alternatively applied to scenarios for inviting users in other fields. In the present disclosure, only the method being applied to the field of live broadcast is used as an example for description.

FIG. 1 is a schematic diagram of an implementation environment of a user inviting method according to an embodiment of the present disclosure. Referring to FIG. 1, the implementation environment may include a first terminal 110, a second terminal 120, a server 130, a computer device 140 corresponding to an authentication platform, and a blockchain system 150.

The first terminal 110 may be a terminal used by an invitation initiating user, such as, the invitation initiating user may be a service provider of a live broadcast platform; the second terminal 120 may be a terminal used by an invited user; a client of a target application may be installed and executed in both the first terminal 110 and the second terminal 120, where the target application may be a social application; the invitation initiating user may communicate with the invited user through the target application, that is, share a two-dimensional code through the target application. A user account may log in to both the first terminal 110 and the second terminal 120. The first terminal 110 and the second terminal 120 may be a smartphone, a tablet computer, an e-book reader, a Moving Picture Experts Group Audio Layer III (MP3) player, a Moving Picture Experts Group Audio Layer IV (MP4) player, a laptop computer, and a desktop computer.

The server 130 may be a server corresponding to the target application and is used for providing back-end service for the target application. The server 130 may be an independent physical server, or may be a server cluster or a distributed system including a plurality of physical servers, or may be a cloud server that provides cloud computing services such as a cloud service, a cloud database, cloud computing, a cloud function, cloud storage, a network service, cloud communication, a middleware service, a domain name service, a security service, a content delivery network (CDN), big data, and an artificial intelligence (AI) platform.

Figure 2:
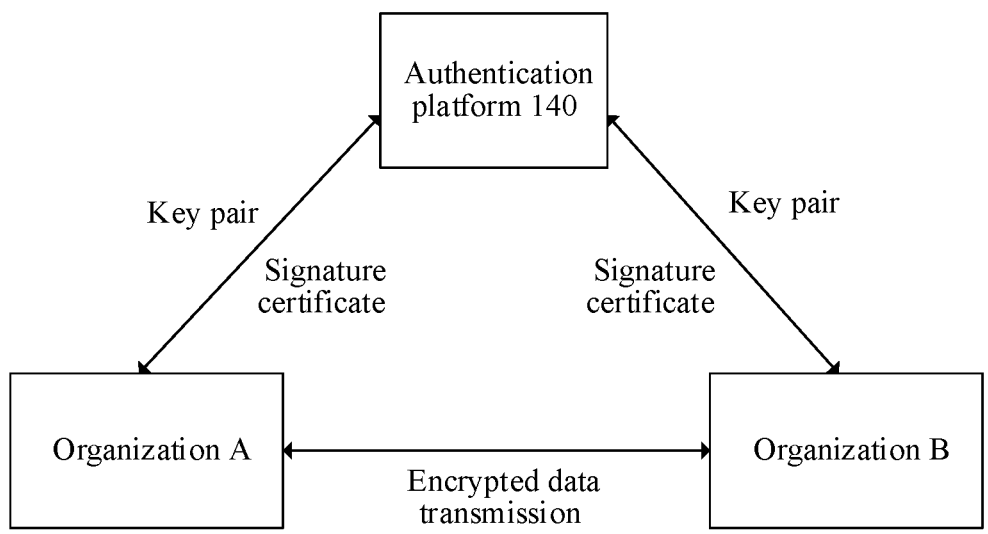
FIG. 2 is a schematic diagram of data exchange of an authentication platform according to embodiment(s) of the present disclosure.

The computer device 140 corresponding to the authentication platform may be used for performing identity authentication on the users and generating a key pair. The authentication platform may be a third-party authentication platform, or may be other organizations or platforms. Using this solution being applied to the field of live broadcast as an example, the authentication platform may be a live broadcast platform which may perform identity authentication on the service provider and settled-in users, and may also generate a key pair based on a data transmission request of the service provider or users. FIG. 2 is a schematic diagram of data exchange of an authentication platform according to an embodiment of the present disclosure. An authentication platform 140 may perform identity authentication on an organization A and an organization B, and in response to that the identity authentication on each organization succeeds, issue a signature certificate for each organization, where the signature certificate may carry a private key signature of the authentication platform 140. When any of the organizations may transmit encrypted data, the key pair generated by the authentication platform may be obtained, to encrypt the data. For example, if the organization A transmits the encrypted data to the organization B, a public key in the key pair may be used for encrypting the data, and the organization B may decrypt the data by using a private key. The organization A may further transmit its own signature certificate to the organization B, so that the organization B may perform identity verification on the data sender. The authentication platform 140 may be an independent physical server, or may be a server cluster or a distributed system including a plurality of physical servers, or may be a cloud server that provides cloud computing services such as a cloud service, a cloud database, cloud computing, a cloud function, cloud storage, a network service, cloud communication, a middleware service, a domain name service, a security service, a CDN, big data, and an AI platform.

A blockchain system 150 may include a plurality of node devices 1501. The node devices 1501 may be computer devices from different organizations, may be computer devices from the same organization, or may be computer devices of common users, which is not limited in this embodiment of the present disclosure. The node devices 1501 may be computing devices in any forms in a network, such as servers, hosts, and user terminals. Data may be shared between a node device 1501 and another node device 1501. A peer-to-peer (P2P) network is established between the node devices 1501 based on a P2P protocol. The P2P protocol is an application layer protocol that is run on a transmission control protocol (TCP).

Each node device 1501 may receive input information in a process of normal operation, and maintain shared data in the blockchain system 150 based on the received input information, that is, maintain a blockchain of the blockchain system 150. To ensure information interworking in the blockchain system 150, information connection may exist between every two node devices 1501 in the blockchain system 150. Information transmission is performed between the node devices 1501 through the information connection. For example, in response to that any node device 1501 in the blockchain system 150 receives input information, another node device 1501 in the blockchain system 150 may also obtain the input information, and store the input information as data in the shared data, so that consistent data is stored in some or all node devices 1501 in the blockchain system 150.

The first terminal 110, the second terminal 120, the server 130, the computer device 140 corresponding to the authentication platform, and the blockchain system 150 may be connected through a wired or wireless network, to perform data exchange between devices.

Figure 3:
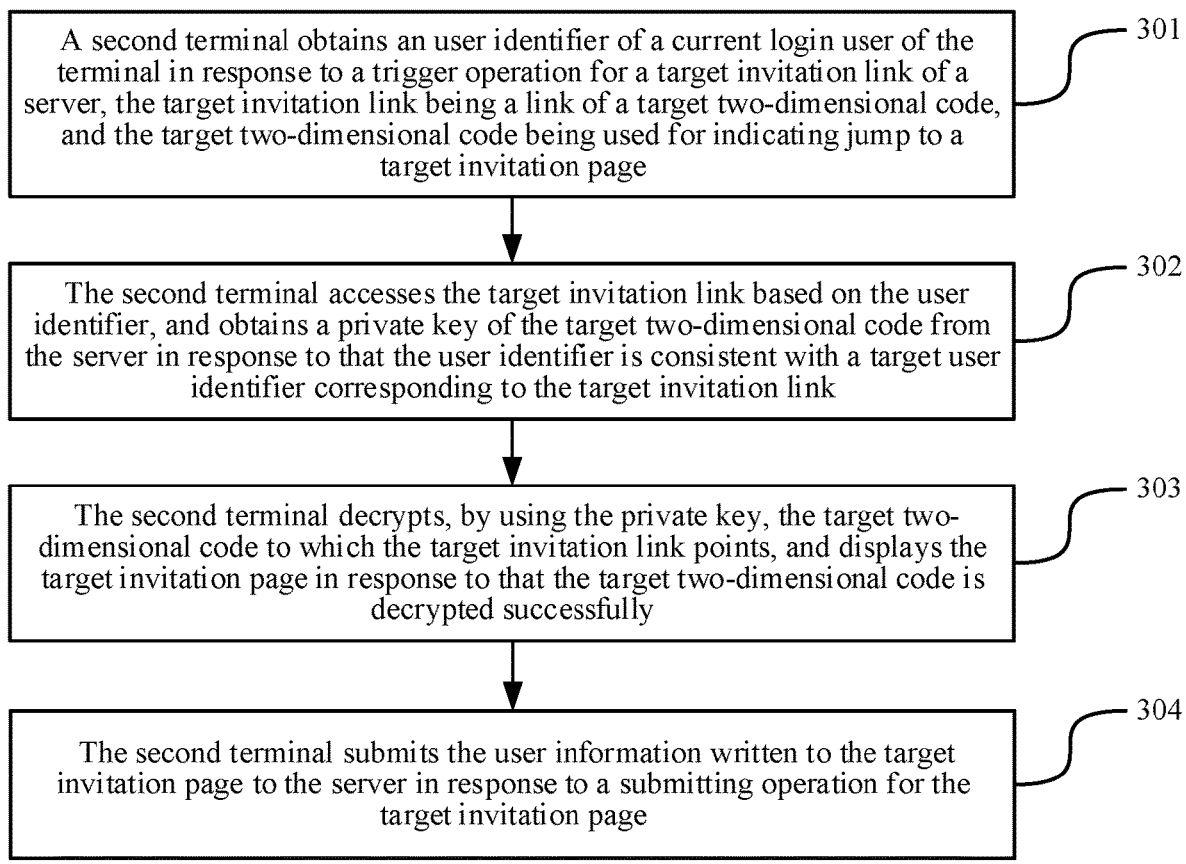
FIG. 3 is a schematic flowchart of a user inviting method according to embodiment(s) of the present disclosure.

FIG. 3 is a flowchart of a user inviting method according to an embodiment of the present disclosure. The method may be applied to the second terminal in the implementation environment. In this embodiment of the present disclosure, the second terminal is used as an execution entity. Referring to FIG. 3, the user inviting method is briefly introduced:

301: The second terminal obtains a user identifier of a current login user of the terminal in response to a trigger operation for a target invitation link of a server, the target invitation link being a link of a target two-dimensional code, and the target two-dimensional code being used for indicating jump to a target invitation page.

The target invitation link may be a link transmitted by an invitation initiating user. The target invitation page indicated by the target two-dimensional code may be used for collecting user information of an invited user. Using the solution applied to the field of live broadcast as an example, in response to that a service provider of a live broadcast platform invites a user to settle in the live broadcast platform, the service provider may transmit the target invitation link to the user. The target two-dimensional code is shared through the target invitation link, so that the invited user may obtain the target invitation page based on the target two-dimensional code, to perform a subsequent step of user information writing.

In some embodiments, the second terminal may display the received target invitation link. In response to that a trigger operation of the user on the target invitation link is detected, a user identifier of a current login user of the terminal may be obtained. The trigger operation may be a click operation, a long-press operation, or the like, which is not limited in this embodiment of the present disclosure.

302: The second terminal accesses the target invitation link based on the user identifier, and obtains a private key of the target two-dimensional code from the server in response to that the user identifier is consistent with a target user identifier corresponding to the target invitation link.

The target user identifier is a user identifier of the invited user.

In an embodiment of the present disclosure, the target two-dimensional code is encrypted based on an asymmetric cryptographic technology. For example, the target two-dimensional code may be encrypted by using a public key in a key pair, and in response to that the user obtains the target two-dimensional code, a private key in the key pair may be used for decryption, to obtain information in the two-dimensional code.

In an embodiment of the present disclosure, users that access the target invitation link may be verified, to ensure that only the invited user may decrypt the target two-dimensional code. In some embodiments, the second terminal may initiate an access request for the target invitation link to the server based on a user identifier of a current login user. The server compares the user identifier in the access request with the target user identifier corresponding to the target invitation link. If the two user identifiers are consistent, it is determined that the current login user is the invited user, to allow the second terminal to obtain a private key corresponding to the target two-dimensional code. If the two user identifiers are not consistent, it is determined that the current login user is not the invited user, not to allow the second terminal to obtain a private key corresponding to the target two-dimensional code.

Applying the solutions, in a process of inviting users, a shared two-dimensional code is encrypted. Only the invited user may perform decryption, to obtain the information of the two-dimensional code, so that fraudulent use of the two-dimensional code can be avoided, to improve the security of the information of the two-dimensional code.

303: The second terminal decrypts, by using the private key, the target two-dimensional code to which the target invitation link points, and displays the target invitation page in response to that the target two-dimensional code is decrypted successfully.

In this embodiment of the present disclosure, after the second terminal decrypts the target two-dimensional code by using the obtained private key, the second terminal may scan and identify the target two-dimensional code automatically, and display a target invitation page indicated by the target two-dimensional code, so that the users implement the subsequent information writing step.

In the present disclosure, after the second terminal decrypts the target two-dimensional code, the second terminal may scan and identify the target two-dimensional code automatically and does not may display an image of the target two-dimensional code, to avoid a situation where a user forwards the two-dimensional code and information in the two-dimensional code is leaked.

304: The second terminal submits the user information written to the target invitation page to the server in response to a submitting operation for the target invitation page.

In some embodiments, the users may write related user information to the target invitation page. The user information may include identity information of the user. Using this solution being applied to the field of live broadcast as an example, in response to that the invited user is a merchant, the user information may include information such as a store name of the merchant, a main business category, business license information, and the number of fans of the merchant on a certain platform. The detailed content of the user information is not limited in this embodiment of the present disclosure. In response to that the second terminal detects that the user confirms to submit information on the target invitation page, the user information written by the user may be submitted to the server.

In the technical solution provided in this embodiment of the present disclosure, the user identifier of the current login user of the terminal is provided in response to that the target invitation link is accessed by receiving the target invitation link, to determine whether the current login user is an invited user, in response to that the current login user is the invited user, a private key of the target two-dimensional code corresponding to the target invitation link is obtained from the server, and the private key is used for decrypting the target two-dimensional code. In response to that the target two-dimensional code is decrypted successfully, a target invitation page indicated by the target two-dimensional code is displayed. User information written to the target invitation page is submitted to the server in response to a submitting operation for the target invitation page. The solutions is applied. Through encryption of the two-dimensional code, only the invited user may perform decryption to ensure the security of the information of the two-dimensional code and avoid fraudulent use of the two-dimensional code.

Figure 4:
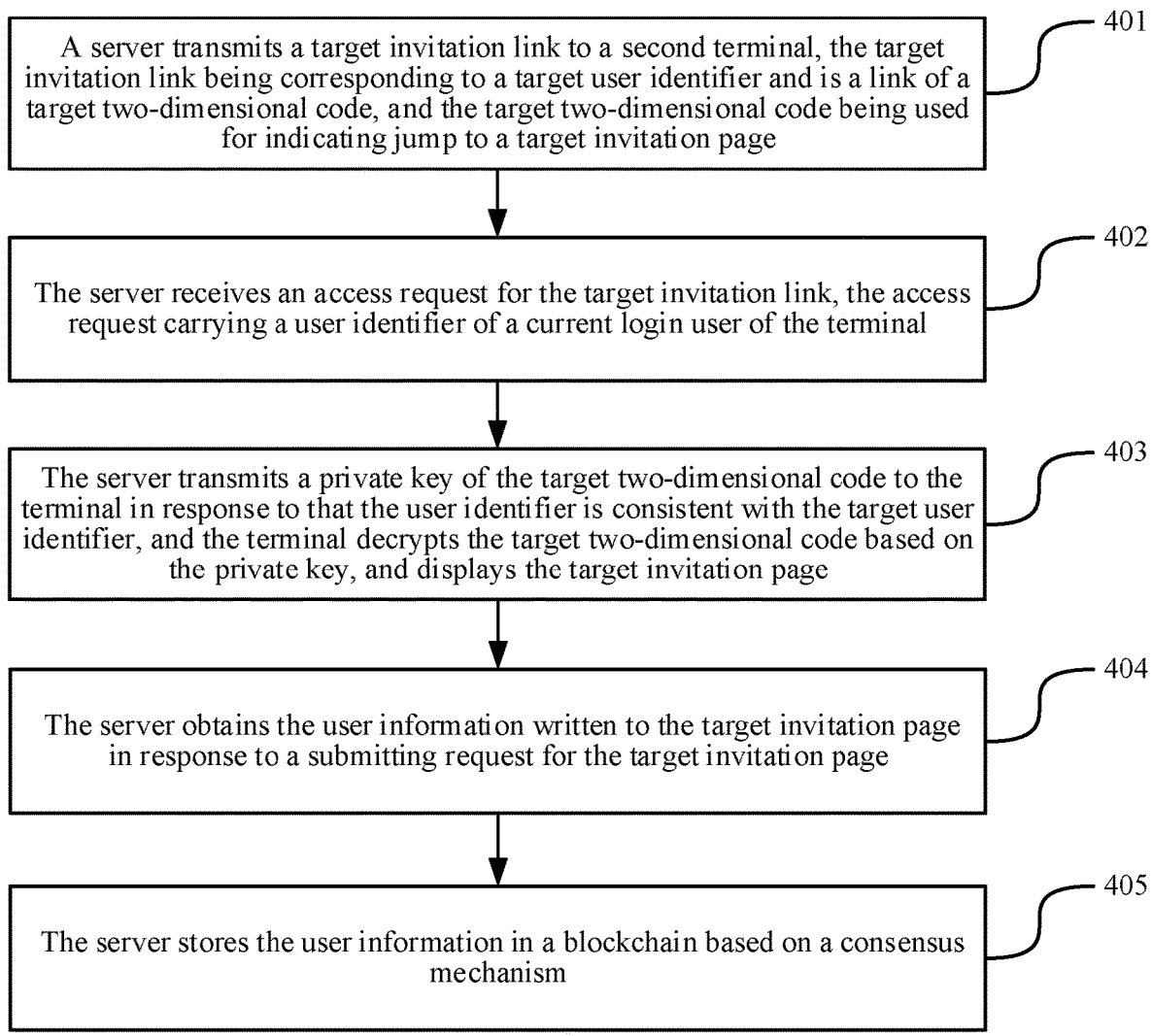
FIG. 4 is a schematic flowchart of a user inviting method according to embodiment(s) of the present disclosure.

FIG. 4 is a flowchart of a user inviting method according to an embodiment of the present disclosure. The method may be applied to the server in the implementation environment. In this embodiment of the present disclosure, the server is used as an execution entity. Referring to FIG. 4, the user inviting method is briefly introduced:

401: The server transmits a target invitation link to a second terminal, the target invitation link being corresponding to a target user identifier and is a link of a target two-dimensional code, and the target two-dimensional code being used for indicating jump to a target invitation page.

The target user identifier may be a user identifier of an invited user. In this embodiment of the present disclosure, a user identifier may uniquely indicate a user.

In some embodiments, the server may receive a user invitation request of an invitation initiating user. The user invitation request may carry the target two-dimensional code and the target user identifier. The server creates the target invitation link based on the target two-dimensional code and the target user identifier, and transmits the target invitation link to a terminal of the invited user, that is, the second terminal.

402: The server receives an access request for the target invitation link, the access request carrying a user identifier of a current login user of the terminal.

In some embodiments, in response to that the second terminal detects a trigger operation of the user for the target invitation link, the second terminal may obtain the user identifier of the current login user, generate the access request for the target invitation link based on the user identifier of the current login user, and transmit the access request to the server.

403: The server transmits a private key of the target two-dimensional code to the terminal in response to that the user identifier is consistent with the target user identifier, and the terminal decrypts the target two-dimensional code based on the private key, and displays the target invitation page.

In this embodiment of the present disclosure, the server may verify whether the current login user of the terminal is the invited user based on the user identifier in the access request and the target user identifier. If the user identifier is consistent with the target user identifier, it is determined that the current login user of the terminal is the invited user, and the second terminal is allowed to obtain a private key corresponding to the target two-dimensional code, to decrypt the target two-dimensional code. The user performs a subsequent step of information writing based on the decrypted target two-dimensional code. If the user identifier is not consistent with the target user identifier, it is determined that the current login user of the terminal is not the invited user, and the second terminal is not allowed to obtain the private key. The user cannot obtain the target invitation page indicated by the target two-dimensional code.

404: The server obtains the user information written to the target invitation page in response to a submitting request for the target invitation page.

In some embodiments, the server may further perform user qualification approval based on the obtained user information, which is not limited in this embodiment of the present disclosure. For example, using this solution being applied to the field of live broadcast as an example, the server may determine whether the user has the qualification of settling in the live broadcast platform based on the user information.

405: The server stores the user information in a blockchain based on a consensus mechanism.

In this embodiment of the present disclosure, the server may store the user information submitted by the user in the blockchain. Because data store in the blockchain is non-tamperable and undeletable, it may be ensured that the user information is neither lost nor tampered with, so that subsequent verification of information is performed.

Applying the method, the server verifies the user that requests to access the target invitation link and determines whether the user is the invited user, to ensure that only the invited user can obtain the private key of the target two-dimensional code, to avoid fraudulent use of the two-dimensional code. The obtained user information is stored on the blockchain, to ensure the security and validity of data, and ensure that the user information is traceable and verifiable.

Figure 5:
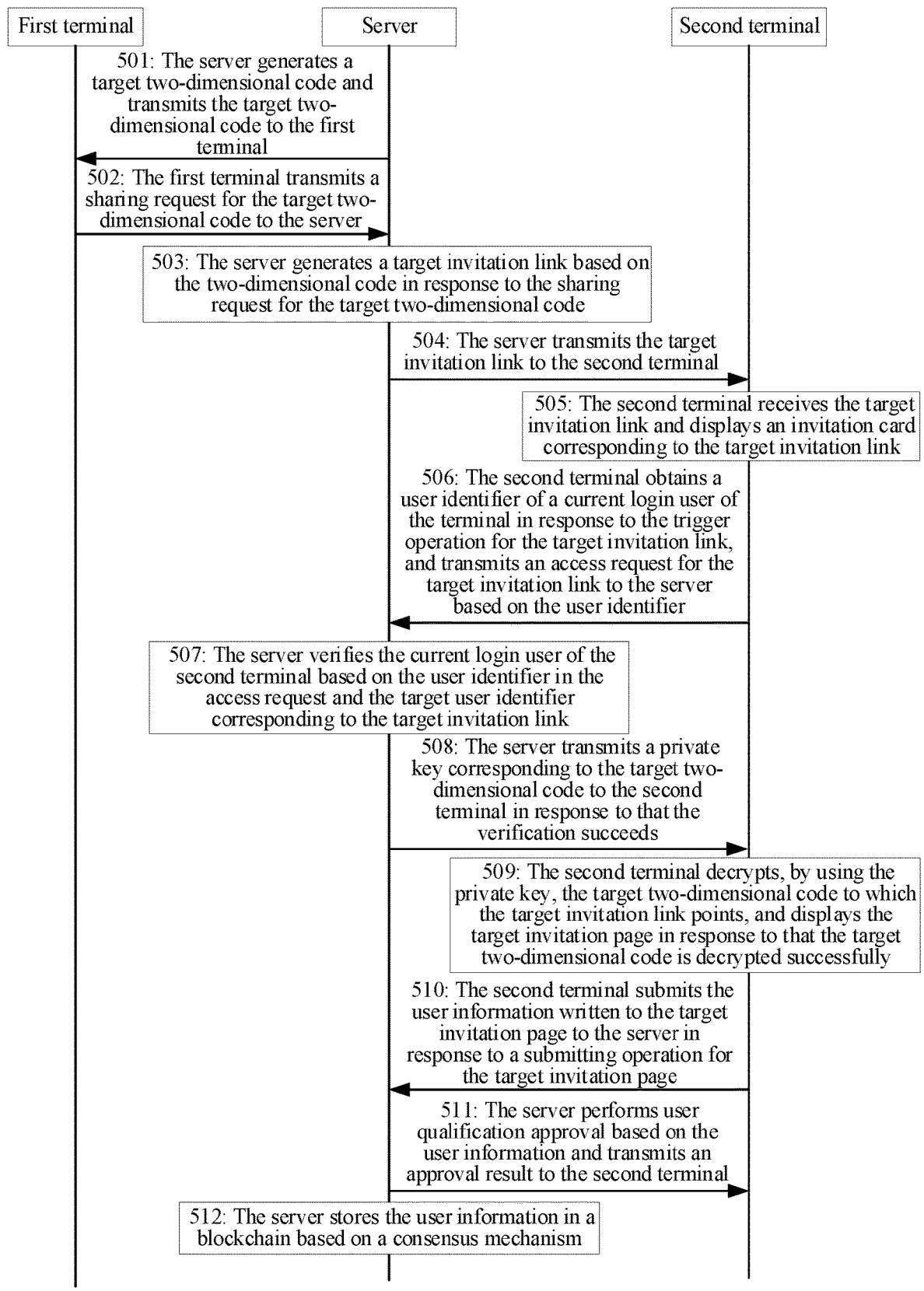
FIG. 5 is a schematic flowchart of a user inviting method according to embodiment(s) of the present disclosure.

The embodiments are brief introductions of the user inviting method. Referring to FIG. 5, the user inviting method being applied to the field of live broadcast is used as an example to describe the method. FIG. 5 is a flowchart of a user inviting method according to an embodiment of the present disclosure. The method may be applied to the implementation environment shown in FIG. 1. Referring to FIG. 5, the user inviting method may include the following steps.

501: A server generates a target two-dimensional code and transmits the target two-dimensional code to a first terminal.

Figure 6:
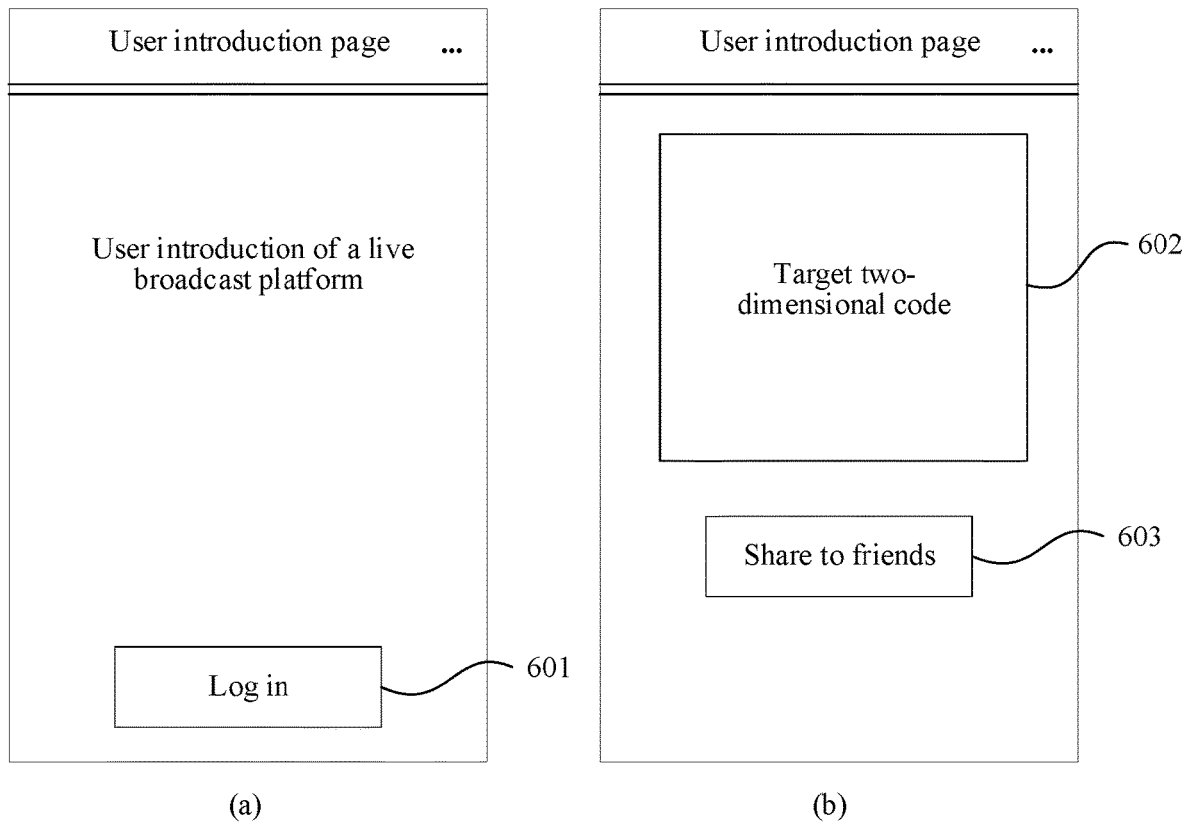
FIG. 6 is a schematic diagram of a user introduction page according to embodiment(s) of the present disclosure.

In some embodiments, the server may generate the target two-dimensional code in response to a two-dimensional code obtaining request of the first terminal. Using the solution being applied to the field of live broadcast as an example, the first terminal may be a terminal used by a service provider of a live broadcast platform and the service provider may transmit the two-dimensional code obtaining request to the server through the first terminal. The server may generate the target two-dimensional code based on the two-dimensional code obtaining request, and transmit the target two-dimensional code to the first terminal. The service provider may share the target two-dimensional code to other users, to invite the other users to settle in the live broadcast platform. In some embodiments, the first terminal may display a user introduction page. FIG. 6 is a schematic diagram of a user introduction page according to an embodiment of the present disclosure. In response to that an invitation initiating user, that is, a service provider does not log in, the user introduction page may be shown in (a) in FIG. 6. The user introduction page may display a login control 601, to remind users to log in. In response to that an invitation initiating user, that is, a service provider logs in, the user introduction page may be shown in (b) in FIG. 6. The user introduction page may display a target two-dimensional code 602 and a sharing control 603, where the sharing control may be used for sharing the target two-dimensional code. In some embodiments, if the first terminal detects that the service provider accesses the user introduction page and the service provider logs in, the first terminal may transmit a two-dimensional code obtaining request to the server. The server may generate a target two-dimensional code based on the two-dimensional code obtaining request and the target two-dimensional code may carry an address of the target invitation page.

The description of the method for generating the target two-dimensional code is merely an exemplary description. This embodiment of the present disclosure sets no limitation on a specific method for generating the target two-dimensional code.

502: The first terminal transmits a sharing request for the target two-dimensional code to the server.

In some embodiments, in response to that the first terminal detects that the invitation initiating user, that is, the service provider performs a trigger operation for a sharing control in the user introduction page, a contact list of the invitation initiating user is displayed, and the invitation initiating user selects an invited user from the contact list. The invitation initiating user may select one or more users, or may select a group, which is not limited in this embodiment of the present disclosure. In this embodiment of the present disclosure, the invitation initiating user selecting only one user is used as an example for description. The first terminal may use a user that the invitation initiating user selects in the contact list as the invited user, obtain a target user identifier of the invited user, generate a sharing request based on the target user identifier and the target two-dimensional code, and transmit the sharing request to the server.

503: The server generates a target invitation link based on the two-dimensional code in response to the sharing request for the target two-dimensional code.

In some embodiments, the server transmits a key pair obtaining request to an authentication platform in response to the sharing request for the target two-dimensional code, obtains a public key and a private key corresponding to the target two-dimensional code from the authentication platform, encrypts the target two-dimensional code by using the public key, and generates the target invitation link based on the encrypted target two-dimensional code.

In some embodiments, after the authentication platform receives the key pair obtaining request, the key pair may be generated based on an RSA encryption algorithm, that is, the public key and the private key are generated. In actual implementation, the authentication platform may first generate two prime numbers p and q randomly. The prime number may be a prime number greater than a target threshold. The target threshold may be set by a developer, which is not limited in this embodiment of the present disclosure. Then, the authentication platform may obtain a product of p and q, denoted as n, obtain a product of p−1 and q−1, denoted as Φ(n). A random integer e greater than 1 and less than Φ(n) is then selected, so that a greatest common divisor of e and Φ(n) is 1. At last, the authentication platform may obtain a parameter d based on e and Φ(n), where the value of d may satisfy the following formula (1):

$$d*e=1 \bmod \Phi(n) \quad (1),\text{ where}$$

mod represents a remainder operation; e is the random integer; and Φ(n) is the product of p−1 and q−1.

The authentication platform may determine {e,n} as a public key, and {d,n} as a private key. In certain embodiment(s), to ensure the security of the key pair, and prevent the key pair from being deduced, the authentication platform may destruct p and q. A specific process of encryption based on the key pair can be represented as the following formula (2), and the corresponding decryption process can be represented as the following formula (3):

$$Ek(x)=xe \bmod n \quad (2); \text{ and}$$

$$Dk(y)=yd \bmod n \quad (3), \text{ where}$$

x may represent a to-be-encrypted object, such as the target two-dimensional code; y may be represented as an encrypted object, such as an encrypted target two-dimensional code; and Ek( ) may represent an encryption operation and Dk( ) may represent a decryption operation.

The description of the method for generating the key pair is merely an exemplary description. This embodiment of the present disclosure sets no limitation on a specific method for obtaining the key pair.

In this embodiment of the present disclosure, the target two-dimensional code is encrypted through an asymmetric cryptographic technology, to improve the security of the target two-dimensional code effectively and avoid the fraudulent use of the target two-dimensional code.

504: The server transmits the target invitation link to a second terminal.

In some embodiments, after the server determines the invited user based on the target user identifier carried in the sharing request of the first terminal, the server may transmit the target invitation link to a terminal of the invited user, that is, the second terminal.

505: The second terminal receives the target invitation link and displays an invitation card corresponding to the target invitation link.

Figure 7:
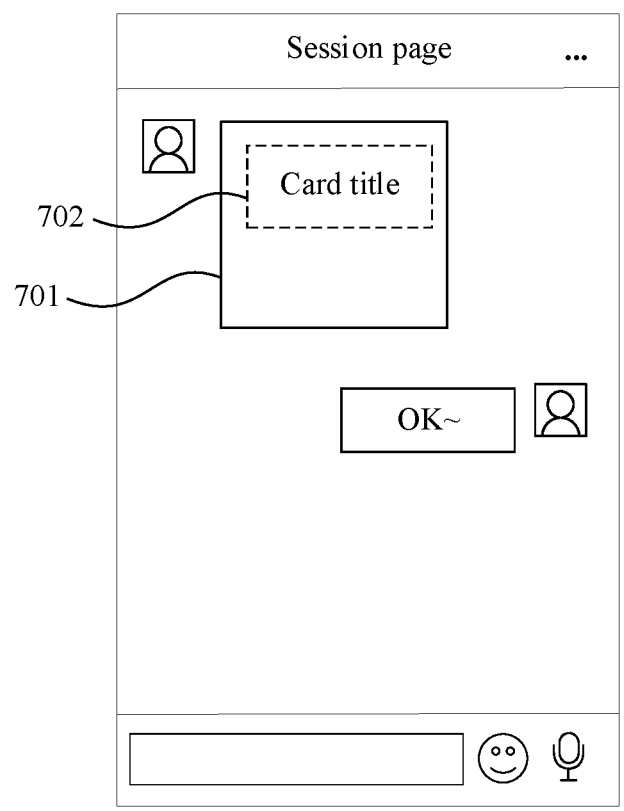
FIG. 7 is a schematic diagram of an invitation card according to embodiment(s) of the present disclosure.

In some embodiments, the target invitation link may be displayed in the form of the invitation card, that is, the invitation card is associated with the target invitation link, and the user performs the trigger operation on the invitation card, that is, performs the trigger operation on the target invitation link. FIG. 7 is a schematic diagram of an invitation card according to an embodiment of the present disclosure. In a session page of a service provider and an invited user, an invitation card 701 may be displayed, where the invitation card 701 may include a card title 702, to remind the user of main content of a link corresponding to the invitation card.

The description of the method for displaying the target invitation link is merely an example for description, and the target invitation link may alternatively be displayed in other forms, which is not limited in this embodiment of the present disclosure.

506: The second terminal obtains a user identifier of a current login user of the terminal in response to the trigger operation for the target invitation link, and transmits an access request for the target invitation link to the server based on the user identifier.

In some embodiments, in response to that the second terminal detects the trigger operation of the user for the invitation card, that is, the target invitation link, the second terminal may obtain the user identifier of the current login user, generate the access request for the target invitation link based on the user identifier, and transmit the access request to the server. In response to that the server receives the access request for the target invitation link, the server may obtain the user identifier carried in the access request, and the server may perform a subsequent step of user verification based on the user identifier.

507: The server verifies the current login user of the second terminal based on the user identifier in the access request and the target user identifier corresponding to the target invitation link.

In some embodiments, the server may determine whether the user identifier is consistent with the target user identifier, and determine whether the current login user of the second terminal is an invited user. If the two user identifiers are consistent, it may be determined that the current login user of the second terminal is the invited user. The server may transmit the private key of the target two-dimensional code to the terminal, that is, the following step 508 is performed. If the two user identifiers are not consistent, it may be determined that the current login user of the second terminal is not the invited user. The server may transmit access rejection prompt information to the second terminal. Applying the solution, the target two-dimensional code may be prevented from being obtained illegally by verifying the user accessing the target invitation link.

In some embodiments, the server may further determine whether the current login user of the second terminal is invited. Using the solution being applied to the field of live broadcast as an example, the server may determine whether the current login user of the second terminal settles in the live broadcast platform. In actual implementation, user information of each user that settles in the live broadcast platform may be stored on the blockchain. The server may search for the user information corresponding to the user identifier from the blockchain based on the user identifier. If the blockchain has the user information corresponding to the user identifier, it is determined that the user has settled in the live broadcast platform and the user verification fails. The server may transmit, to the first terminal and the second terminal, prompt information indicating that the user has settled in the live broadcast platform and the user invitation fails. If the blockchain does not have the user information corresponding to the user identifier, it is determined that the user does not settle in the live broadcast platform and the user verification succeeds. The server further performs the following step 508. A specific method for searching for the user information in the blockchain is not limited in this embodiment of the present disclosure. In this embodiment of the present disclosure, searching for the user information on the blockchain to determine whether the user has been invited may avoid repeated invitations and data conflicts.

508: The server transmits a private key corresponding to the target two-dimensional code to the second terminal in response to that the verification succeeds.

509: The second terminal decrypts, by using the private key, the target two-dimensional code to which the target invitation link points, and displays the target invitation page in response to that the target two-dimensional code is decrypted successfully.

In this embodiment of the present disclosure, after the second terminal obtains the private key, the second terminal may decrypt the target two-dimensional code by using the private key, may scan and identify the target two-dimensional code automatically, and may display a target invitation page indicated by the target two-dimensional code.

Figure 8:
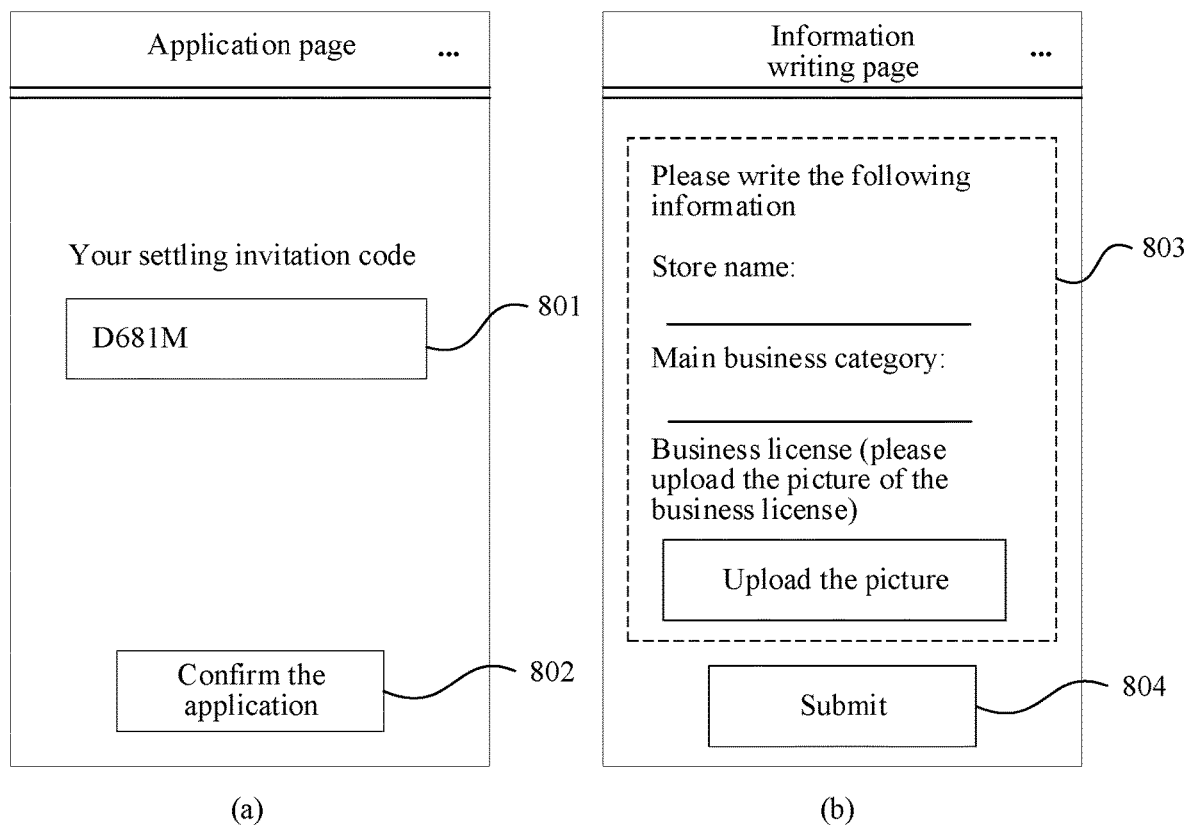
FIG. 8 is a schematic diagram of a target invitation page according to embodiment(s) of the present disclosure.

In some embodiments, the target invitation page may include a multi-layer page. FIG. 8 is a schematic diagram of a target invitation page according to an embodiment of the present disclosure. The target invitation page may include an application page in a first layer. As shown in (a) of FIG. 8, the application page may include an invitation code display area 801, and an application confirming control 802. The target invitation page may further include an information writing page in a second layer. As shown in (b) of FIG. 8, the information writing page may include an information writing area 803 and a submitting control 804.

In this embodiment of the present disclosure, after the second terminal identifies the target two-dimensional code, the application page in the target invitation page may be displayed, and a target invitation code may be further displayed in the invitation code display area of the application page. In some embodiments, the invitation code may associate an invitation initiating user with an invited user. The invitation process is traced through the invitation code, to determine an invitation initiating user which invites each user. The target invitation code may be obtained through any one of the following manners.

Manner 1: Obtain the target invitation code from a card title of the invitation card in response to that the target invitation page is displayed, and write the target invitation code to the invitation code display area of the target invitation page. In some embodiments, the target invitation link may correspond to one target invitation code, where the target invitation code may be displayed in the card title of the invitation card.

Manner 2: Generate the target invitation code based on the private key in response to that the target invitation page is displayed, and write the target invitation code to the invitation code display area of the target invitation page. In some embodiments, after the second terminal obtains the private key, the private key may be used as the target invitation code or the private key is converted into the target invitation code based on a preset condition. The preset condition may be set by a developer, which is not limited in this embodiment of the present disclosure.

In certain embodiment(s), the target invitation code may be obtained through other manners, such as inputted by a user, which is not limited in this embodiment of the present disclosure.

In some embodiments, the user may trigger a submitting request for the application page through a click operation on the application confirming control in the application page. The second terminal displays the information writing page in the target invitation page in response to the submitting request for the application page. The user may provide related user information based on the information writing page.

510: The second terminal submits the user information written to the target invitation page to the server in response to a submitting operation for the target invitation page.

In some embodiments, in response to that the second terminal detects that the user performs the trigger operation on the submitting control in the information writing page, the second terminal may obtain the user information written by the user in the information writing area, generate a submitting request based on the user information, and transmit the submitting request to the server. The server may obtain the user information written to the target invitation page in response to the submitting request for the target invitation page, and perform a subsequent user qualification approval step based on the user information.

511: The server performs user qualification approval based on the user information and transmits an approval result to the second terminal.

In some embodiments, the server may perform user qualification approval based on a target condition and the user information. The target condition may include data restriction information corresponding to the user information. The detailed content of the target condition may be set by the developer, which is not limited in this embodiment of the present disclosure. For example, the target condition may include a main business category range of the merchant, the number of fans of the merchant, and other restriction information. The server may compare the obtained user information with the data restriction information of the target condition. If the user information meets the target condition, it is determined that the user qualification approval succeeds.

Figure 9:
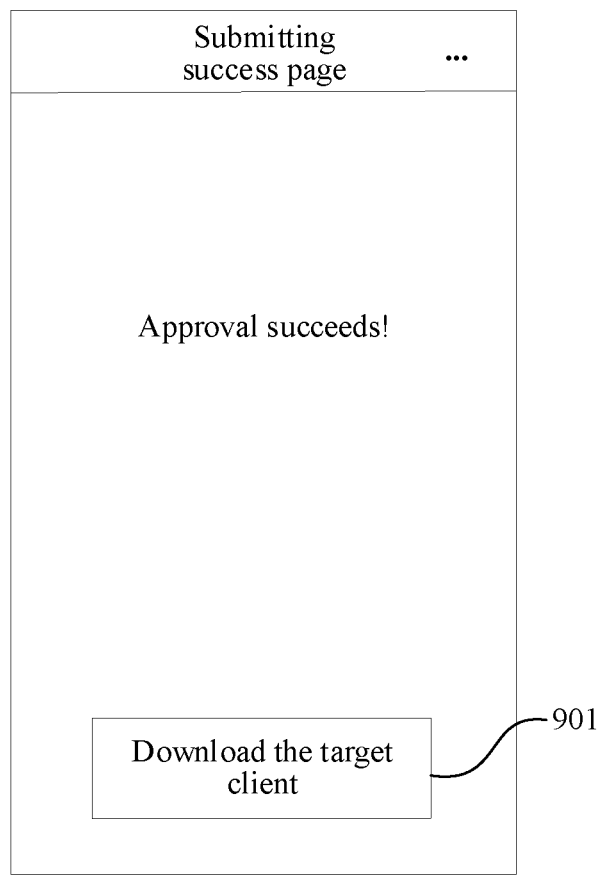
FIG. 9 is a schematic diagram of a submitting success page according to embodiment(s) of the present disclosure.

The server may transmit the approval result to the second terminal. When the approval succeeds, the second terminal may detect whether a target client is currently installed in the terminal. Using the solution being applied to the field of live broadcast as an example, the target client may be a client of the live broadcast platform. If the target client is not installed in the terminal, the second terminal may display a download guide option on a submitting success page, where the download guide option is used for guiding a user to download the target client provided by the server. FIG. 9 is a schematic diagram of a submitting success page according to an embodiment of the present disclosure. The page may display approval success prompt information and a download guide option 901. In response to that the approval fails, the second terminal may display approval failure prompt information, to remind the user to rewrite and submit the user information.

512: The server stores the user information in a blockchain based on a consensus mechanism.

In this embodiment of the present disclosure, after the server determines that the user information is approved successfully, the user information may be stored in the blockchain, to facilitate subsequent verification. In an implementation, the server may obtain a user identifier of the invitation initiating user, and construct target data based on the user identifier of the invitation initiating user and the user information. For example, the target data may be represented in the form of a key-value pair. The user identifier of the invitation initiating user may be a key element of the target data, and the user information may be a value element of the target data. In this embodiment of the present disclosure, the target data is constructed based on the user identifier of the invitation initiating user and the user information of the invited user. The invitation initiating user is associated with the user information of the invited user, to make each invitation process traceable. In certain embodiment(s), the target data may alternatively be represented in other forms, which is not limited in this embodiment of the present disclosure.

In some embodiments, the server may transmit the target data to a target node device in a blockchain system, and the target node devices broadcasts the target data in the blockchain system. Each node device in the blockchain system verifies the target data. After the target data is verified successfully, each node device may store the target data in a local transaction pool. A node device in the blockchain system may package data in the transaction pool according to a target period, generate a new block, and then broadcast the new block. Each node device of the blockchain system or a consensus node device may perform a consensus on the new block. If the consensus on the new block succeeds, the new block may be added to the tail end of the target blockchain, that is, the target data including the user information is stored in the blockchain. If the consensus fails, the new block adding step may not be performed. The transaction pool may be a database maintained by each node device locally. The transaction pool is used for storing transaction data that is not stored on the blockchain. The target period is set by the developer, which is not limited in this embodiment of the present disclosure. For example, in a bitcoin system, the target period may be set to 10 minutes. In the consensus process, the involved consensus mechanism may be a proof of work mechanism, which is not limited in this embodiment of the present disclosure.

In some embodiments, the target node device may alternatively construct a chained hash table based on the target data received in the target period. The chained hash table may include a plurality of sub-chain tables. The target data with the same key element may be stored in the same sub-chain table. The target node device may summarize the target data in the form of the chained hash table and store the summarized target data in the blockchain. For example, the target node device may perform a hash operation based on the key element of the target data, and map the key element to a location code. The location code may be used for indicating a storage location of the target data in the chained hash table.

The description of the method for storing the target data in the blockchain is merely an exemplary description. This embodiment of the present disclosure sets no limitation on a specific method for storing the target data in the blockchain.

In the technical solution provided in this embodiment of the present disclosure, the user identifier of the current login user of the terminal is provided in response to that the target invitation link is accessed by receiving the target invitation link, to determine whether the current login user is an invited user, in response to that the current login user is the invited user, a private key of the target two-dimensional code corresponding to the target invitation link is obtained from the server, and the private key is used for decrypting the target two-dimensional code. In response to that the target two-dimensional code is decrypted successfully, a target invitation page indicated by the target two-dimensional code is displayed. User information written to the target invitation page is submitted to the server in response to a submitting operation for the target invitation page. The solutions is applied. Through encryption of the two-dimensional code, only the invited user may perform decryption to ensure the security of the information of the two-dimensional code and avoid fraudulent use of the two-dimensional code.

Figure 10:
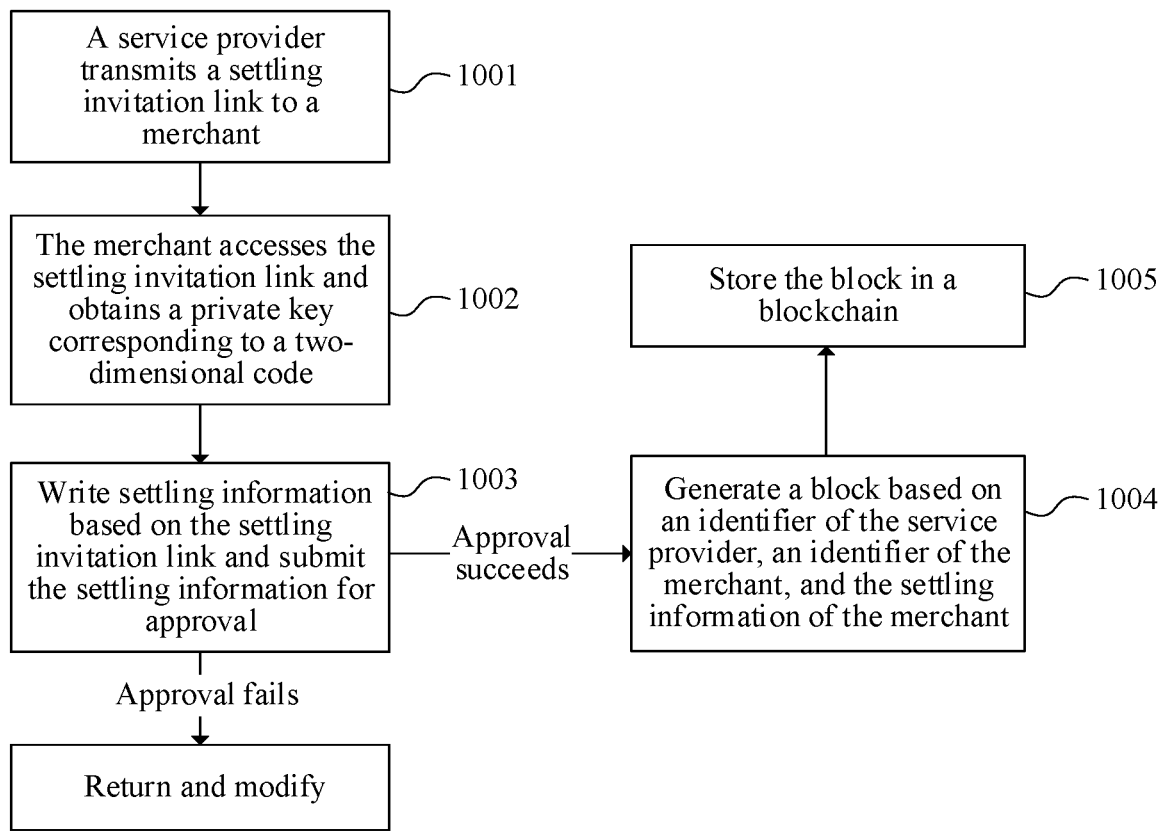
FIG. 10 is a schematic diagram of inviting a merchant to settle in a live broadcast platform according to embodiment(s) of the present disclosure.

The embodiments are the detailed introduction of the user inviting method provided in the present disclosure. This solution is described with reference to FIG. 10 and the specific scenario of being applied to the field of live broadcast. FIG. 10 is a schematic diagram of inviting a merchant to settle in a live broadcast platform according to an embodiment of the present disclosure. Referring to FIG. 10, a service provider transmits a settling invitation link to the merchant, that is, step 1001 is performed. The settling invitation link may be generated based on a name, an identifier, and an encrypted two-dimensional code of the service provider. The merchant accesses the settling invitation link and obtains a private key corresponding to the two-dimensional code, that is, the merchant performs step 1002; and writes settling information based on the settling invitation link and submits the settling information for approval, that is, performs step 1003. If the approval fails, the submitted information is returned and is modified by the merchant; if the approval succeeds, the server performs step 1004 of generating a block based on the identifier of the service provider, an identifier of the merchant, and the settling information of the merchant, and then performs step 1005 of storing the block in a blockchain, that is, each node performs a consensus on the blockchain, to perform data storage on the blockchain. When the solution is applied to the field of live broadcast, in an aspect, the two-dimensional code is encrypted, to avoid fraudulent use of the two-dimensional code and prevent an unqualified merchant from settling in the live broadcast platform; in another aspect, information of the merchant is stored in the blockchain, to make the information traceable and searchable.

The technical solutions may be combined randomly to form optional embodiments of the present disclosure. Details are not described herein again.

Figure 11:
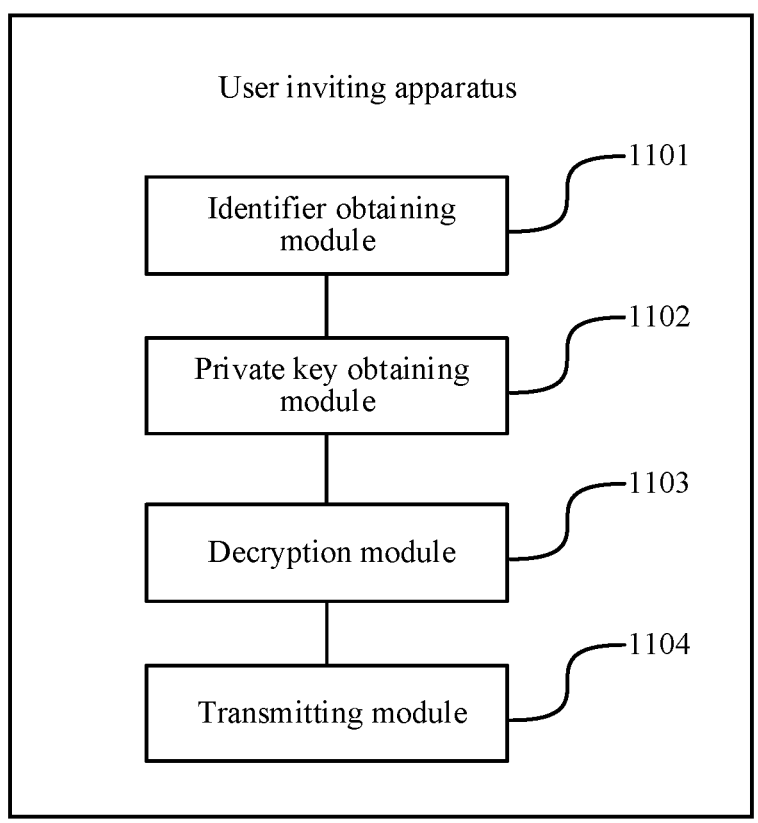
FIG. 11 is a schematic structural diagram of a user inviting apparatus according to embodiment(s) of the present disclosure.

FIG. 11 is a schematic structural diagram of a user inviting apparatus according to an embodiment of the present disclosure. Referring to FIG. 11, the apparatus includes: an identifier obtaining module 1101, configured to obtain a user identifier of a current login user of a terminal in response to a trigger operation for a target invitation link of a server, the target invitation link being a link of a target two-dimensional code, and the target two-dimensional code being used for indicating jump to a target invitation page; a private key obtaining module 1102, configured to access the target invitation link based on the user identifier, and obtain a private key of the target two-dimensional code from the server in response to that the user identifier is consistent with a target user identifier corresponding to the target invitation link; a decryption module 1103, configured to decrypt, by using the private key, the target two-dimensional code to which the target invitation link points, and display the target invitation page in response to that the target two-dimensional code is decrypted successfully; and a transmitting module 1104, configured to submit the user information written to the target invitation page to the server in response to a submitting operation for the target invitation page.

In some embodiments, the decryption module 1103 is configured to: display an application page in the target invitation page; and display an information writing page in the target invitation page in response to a submitting request for the application page.

In some embodiments, the apparatus further includes: a display module, configured to display an invitation card, the invitation card being associated with the target invitation link.

In some embodiments, the display module is configured to: obtain a target invitation code from a card title of the invitation card in response to that the target invitation page is displayed, and write the target invitation code to an invitation code display area of the target invitation page.

In some embodiments, the display module is configured to: generate a target invitation code based on the private key in response to that the target invitation page is displayed, and write the target invitation code to an invitation code display area of the target invitation page.

In some embodiments, the apparatus further includes: a detecting module, configured to detect whether a target client is currently installed in the terminal; and display, if the target client is not installed in the terminal, a download guide option on a submitting success page, where the download guide option is used for guiding the user to download the target client provided by the server.

In the apparatus provided in this embodiment of the present disclosure, the user identifier of the current login user of the terminal is provided in response to that the target invitation link is accessed by receiving the target invitation link, to determine whether the current login user is an invited user, in response to that the current login user is the invited user, a private key of the target two-dimensional code corresponding to the target invitation link is obtained from the server, and the private key is used for decrypting the target two-dimensional code. In response to that the target two-dimensional code is decrypted successfully, a target invitation page indicated by the target two-dimensional code is displayed. User information written to the target invitation page is submitted to the server in response to a submitting operation for the target invitation page. The apparatus is applied. Through encryption of the two-dimensional code, only the invited user may perform decryption to ensure the security of the information of the two-dimensional code and avoid fraudulent use of the two-dimensional code.

Figure 12:
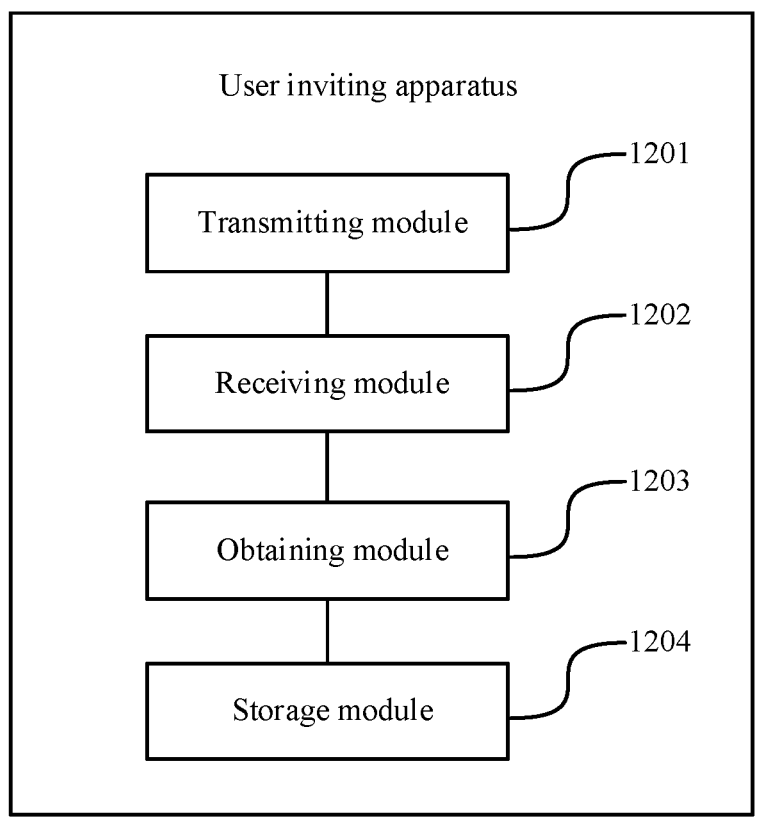
FIG. 12 is a schematic structural diagram of a user inviting apparatus according to embodiment(s) of the present disclosure.

FIG. 12 is a schematic structural diagram of a user inviting apparatus according to an embodiment of the present disclosure. Referring to FIG. 12, the apparatus includes: a transmitting module 1201, configured to transmit a target invitation link to a terminal, the target invitation link being corresponding to a target user identifier and is a link of a target two-dimensional code, and the target two-dimensional code being used for indicating jump to a target invitation page; a receiving module 1202, configured to receive an access request for the target invitation link, the access request carrying a user identifier of a current login user on the terminal; the transmitting module 1201 being configured to transmit a private key of the target two-dimensional code to the terminal in response to that the user identifier is consistent with the target user identifier, and the terminal decrypting the target two-dimensional code based on the private key, and displaying the target invitation page; an obtaining module 1203, configured to obtain user information written to the target invitation page in response to a submitting request for the target invitation page; and a storage module 1204, configured to store the user information in a blockchain based on a consensus mechanism.

In some embodiments, the apparatus further includes: a generation module, configured to generate the target two-dimensional code; and generate the target invitation link based on the two-dimensional code in response to a sharing request for the target two-dimensional code.

In some embodiments, the generation module is configured to: obtain a public key and the private key corresponding to the target two-dimensional code from an authentication platform in response to the sharing request for the target two-dimensional code; encrypt the target two-dimensional code by using the public key; and generate the target invitation link based on the encrypted target two-dimensional code.

In some embodiments, the apparatus further includes: an approval module, configured to perform user qualification approval based on a target condition and the user information, where the target condition includes data restriction information corresponding to the user information; and perform the step of storing the user information in the blockchain in response to that the user qualification approval succeeds.

In some embodiments, the storage module 1204 is configured to: obtain a user identifier of an invitation initiating user; construct target data based on the user identifier of the invitation initiating user and the user information; and store the target information in the blockchain based on the consensus mechanism.

The user inviting apparatus provided in the embodiments is illustrated with an example of division of the functional modules during user invitation. In actual implementation, the functions may be allocated to and performed by different functional modules, that is, the internal structure of the apparatus is divided into different functional modules, to implement all or some of the functions described above. In addition, the user inviting apparatus and user inviting method provided in the embodiments belong to the same conception. For the specific implementation process, reference may be made to the method embodiments, and details are not described herein again.

Figure 13:
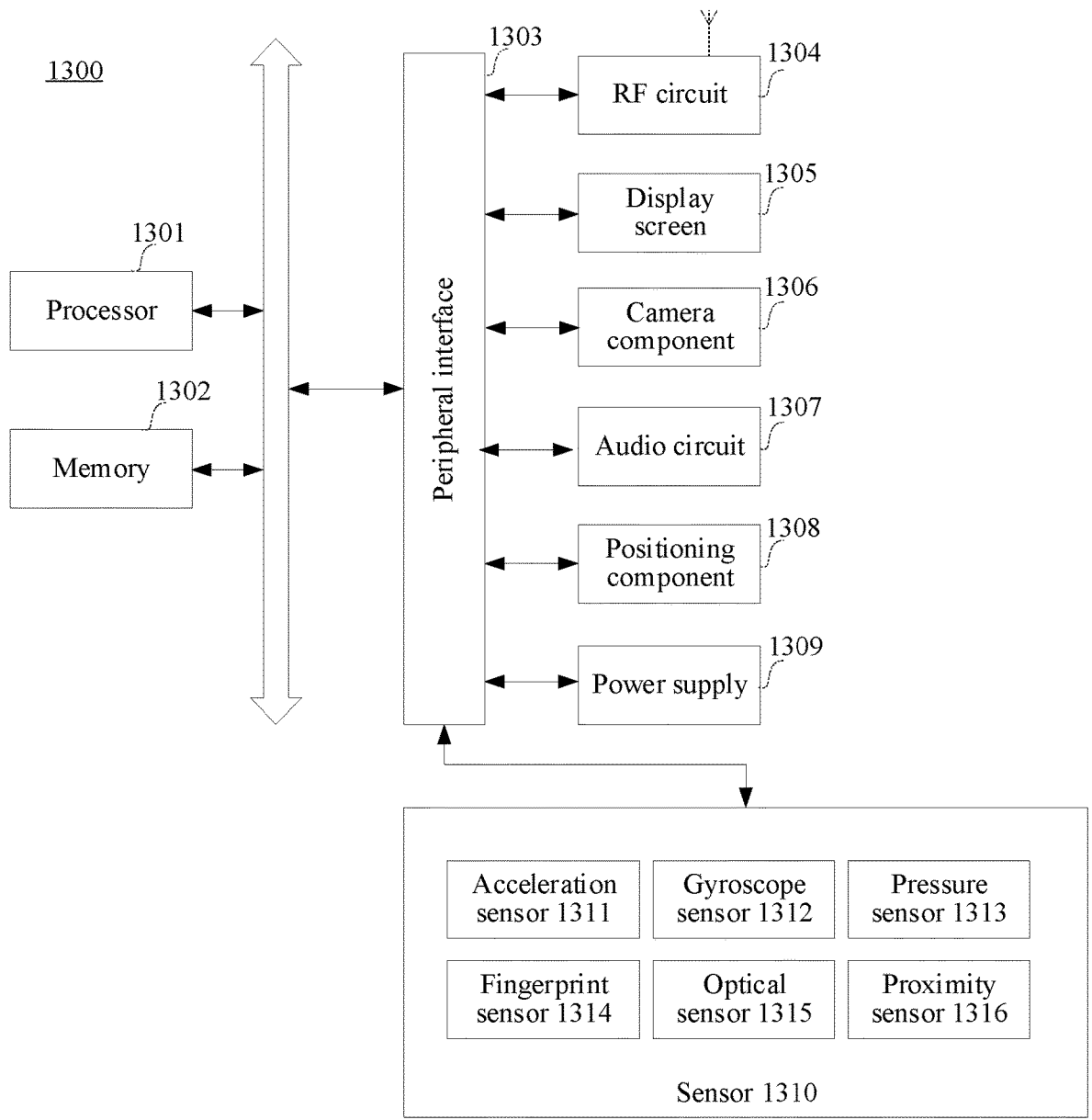
FIG. 13 is a schematic structural diagram of a terminal according to embodiment(s) of the present disclosure.

The computer device provided in the technical solution may be implemented as a terminal or a server. Using an example in which the computer device is implemented as the terminal, FIG. 13 is a schematic structural diagram of a terminal according to an embodiment of the present disclosure. The terminal 1300 may be a smartphone, a tablet computer, an MP3 player, an MP4 player, a notebook computer, or a desktop computer. The terminal 1300 may also be referred to as a user equipment, a portable terminal, a laptop terminal, a desktop terminal, or the like.

Generally, the terminal 1300 includes one or more processors 1301 and one or more memories 1302.

The processor 1301 may include one or more processing cores, for example, a 4-core processor or an 8-core processor. The processor 1301 may be implemented by using at least one hardware form of a digital signal processor (DSP), a field-programmable gate array (FPGA), and a programmable logic array (PLA). The processor 1301 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1301 may be integrated with a Graphics Processing Unit (GPU), which is configured to render and draw a content desirable to be displayed by a display screen. In some embodiments, the processor 1301 may further include an AI processor. The AI processor is configured to process a computing operation related to machine learning.

The memory 1302 may include one or more computer-readable storage media that may be non-transitory. The memory 1302 may further include a high-speed RAM, and a non-volatile memory such as one or more magnetic disk storage devices and a flash storage device. In some embodiments, a non-transitory computer-readable storage medium in the memory 1302 is configured to store at least one piece of program code, the at least one piece of program code being configured to be executed by the processor 1301 to implement the user inviting method provided in the method embodiments of the present disclosure.

In some embodiments, the terminal 1300 may include: a peripheral interface 1303 and at least one peripheral. The processor 1301, the memory 1302, and the peripheral interface 1303 may be connected by using a bus or a signal cable. Each peripheral may be connected to the peripheral interface 1303 by using a bus, a signal cable, or a circuit board. In certain embodiment(s), the peripheral includes at least one of a radio frequency (RF) circuit 1304, a display screen 1305, a camera component 1306, an audio circuit 1307, a positioning component 1308, and a power supply 1309.

The peripheral interface 1303 may be configured to connect at least one peripheral related to Input/Output (I/O) to the processor 1301 and the memory 1302. In some embodiments, the processor 1301, the memory 1302, and the peripheral interface 1303 are integrated into the same chip or circuit board. In some other embodiments, any one or two of the processors 1301, the memory 1302, and the peripheral interface 1303 may be implemented on an independent chip or circuit board, and the implementation is not limited in this embodiment.

The RF circuit 1304 is configured to receive and transmit an RF signal, also referred to as an electromagnetic signal. The RF circuit 1304 communicates with a communication network and another communication device by using the electromagnetic signal. The RF circuit 1304 converts an electrical signal into an electromagnetic signal for transmission, or converts a received electromagnetic signal into an electrical signal. In some embodiments, the RF circuit 1304 includes: an antenna system, an RF transceiver, one or more amplifiers, a tuner, an oscillator, a digital signal processor, a codec chip set, a subscriber identity module card, and the like. The RF circuit 1304 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 1304 may further include a circuit related to near field communication (NFC), which is not limited by the present disclosure.

The display screen 1305 is configured to display a user interface (UI). The UI may include a graph, text, an icon, a video, and any combination thereof. When the display screen 1305 is a touchscreen, the display screen 1305 is further capable of acquiring a touch signal on or above a surface of the display screen 1305. The touch signal may be inputted to the processor 1301 as a control signal for processing. In this scenario, the display screen 1305 may be further configured to provide a virtual button and/or a virtual keyboard that are/is also referred to as a soft button and/or a soft keyboard. In some embodiments, there may be one display screen 1305 disposed on a front panel of the terminal 1300. In some other embodiments, there may be at least two display screens 1305 respectively disposed on different surfaces of the terminal 1300 or designed in a foldable shape. In still some other embodiments, the display screen 1305 may be a flexible display screen, disposed on a curved surface or a folded surface of the terminal 1300. Even, the display screen 1305 may be further set to have a non-rectangular irregular graph, that is, a special-shaped screen. The display screen 1305 may be made of materials such as a liquid crystal display (LCD), and an organic light-emitting diode (OLED).

The camera component 1306 is configured to acquire an image or a video. In some embodiments, the camera component 1306 includes a front-facing camera and a rear-facing camera. Generally, the front-facing camera is disposed on a front panel of the terminal, and the rear-facing camera is disposed on a rear surface of the terminal. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera component 1306 may further include a flash. The flash may be a single color temperature flash, or may be a double color temperature flash. The double-color-temperature flash refers to a combination of a warm-light flash and a cold-light flash, and may be used for light compensation under different color temperatures.

The audio circuit 1307 may include a microphone and a speaker. The speaker is configured to acquire sound waves of a user and an environment, and convert the sound waves into electric signals and input the electrical signals into the processor 1301 for processing, or input the electrical signals into the RF circuit 1304 to implement speech communication. For the purpose of stereo sound acquisition or noise reduction, there may be a plurality of microphones, respectively disposed at different parts of the terminal 1300. The microphone may be further a microphone array or an omnidirectional acquisition microphone. The speaker is configured to convert electric signals from the processor 1301 or the RF circuit 1304 into sound waves. The speaker may be a thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1307 may further include an earphone jack.

The positioning component 1308 is configured to position a current geographical position of the terminal 1300 to implement navigation or Location Based Service (LBS). The positioning component 1308 may be a positioning component based on the global positioning system (GPS) of the United States, the COMPASS System of China, the GLONASS System of Russia, or the GALILEO System of the European Union.

The power supply 1309 is configured to supply power to components in the terminal 1300. The power supply 1309 may be an alternating-current power supply, a direct-current power supply, a disposable battery, or a rechargeable battery. In response to that the power supply 1309 includes the rechargeable battery, the rechargeable battery may support wired charging or wireless charging. The rechargeable battery may be further configured to support a fast charge technology.

In some embodiments, the terminal 1300 further includes one or more sensors 1310. The one or more sensors 1310 include, but are not limited to: an acceleration sensor 1311, a gyroscope sensor 1312, a pressure sensor 1313, a fingerprint sensor 1314, an optical sensor 1315, and a proximity sensor 1316.

The acceleration sensor 1311 may detect a magnitude of acceleration on three coordinate axes of a coordinate system established with the terminal 1300. For example, the acceleration sensor 1311 can be configured to detect components of gravity acceleration on three coordinate axes. The processor 1301 may control, according to a gravity acceleration signal collected by the acceleration sensor 1311, the touch display screen 1305 to display the UI in a landscape view or a portrait view. The acceleration sensor 1311 may be further configured to acquire motion data of a game or a user.

The gyroscope sensor 1312 may detect a body direction and a rotation angle of the terminal 1300. The gyroscope sensor 1312 may cooperate with the acceleration sensor 1311 to acquire a 3D action by the user on the terminal 1300. The processor 1301 may implement the following functions according to data acquired by the gyroscope sensor 1312: motion sensing (for example, the UI is changed according to a tilt operation of a user), image stabilization during shooting, game control, and inertial navigation.

The pressure sensor 1313 may be disposed at a side frame of the terminal 1300 and/or a lower layer of the display screen 1305. When the pressure sensor 1313 is disposed at the side frame of the terminal 1300, a holding signal of the user on the terminal 1300 may be detected. The processor 1301 performs left/right hand recognition or a quick operation according to the holding signal acquired by the pressure sensor 1313. When the pressure sensor 1313 is disposed on the low layer of the display screen 1305, the processor 1301 controls, according to a pressure operation of the user on the display screen 1305, an operable control on the UI. The operable control includes at least one of a button control, a scroll-bar control, an icon control, and a menu control.

The fingerprint sensor 1314 is configured to acquire a fingerprint of a user, and the processor 1301 recognizes an identity of the user according to the fingerprint acquired by the fingerprint sensor 1314, or the fingerprint sensor 1314 recognizes the identity of the user based on the acquired fingerprint. When identifying that the identity of the user is a trusted identity, the processor 1301 authorizes the user to perform related sensitive operations. The sensitive operations include: unlocking a screen, viewing encrypted information, downloading software, paying, changing a setting, and the like. The fingerprint sensor 1314 may be disposed on a front surface, a back surface, or a side surface of the terminal 1300. When a physical button or a vendor logo is disposed on the terminal 1300, the fingerprint 1314 may be integrated with the physical button or the vendor logo.

The optical sensor 1315 is configured to acquire ambient light intensity. In an embodiment, the processor 1301 may control display luminance of the display screen 1305 according to the ambient light intensity collected by the optical sensor 1315. In certain embodiment(s), when the ambient light intensity is relatively high, the display luminance of the display screen 1305 is increased. When the ambient light intensity is relatively low, the display luminance of the display screen 1305 is reduced. In another embodiment, the processor 1301 may further dynamically adjust a camera parameter of the camera component 1306 according to the ambient light intensity acquired by the optical sensor 1315.

The proximity sensor 1316, also referred to as a distance sensor, is generally disposed on the front panel of the terminal 1300. The proximity sensor 1316 is configured to acquire a distance between the user and the front surface of the terminal 1300. In an embodiment, when the proximity sensor 1316 detects that the distance between the user and the front surface of the terminal 1300 gradually becomes small, the display screen 1305 is controlled by the processor 1301 to switch from a screen-on state to a screen-off state. When the proximity sensor 1316 detects that the distance between the user and the front surface of the terminal 1300 gradually increases, the display screen 1305 is controlled by the processor 1301 to switch from the screen-off state to the screen-on state.

A person skilled in the art may understand that the structure shown in FIG. 13 does not constitute a limitation to the terminal 1300, and the terminal may include more or fewer components than those shown in the figure, or some components may be combined, or a different component deployment may be used.

Figure 14:
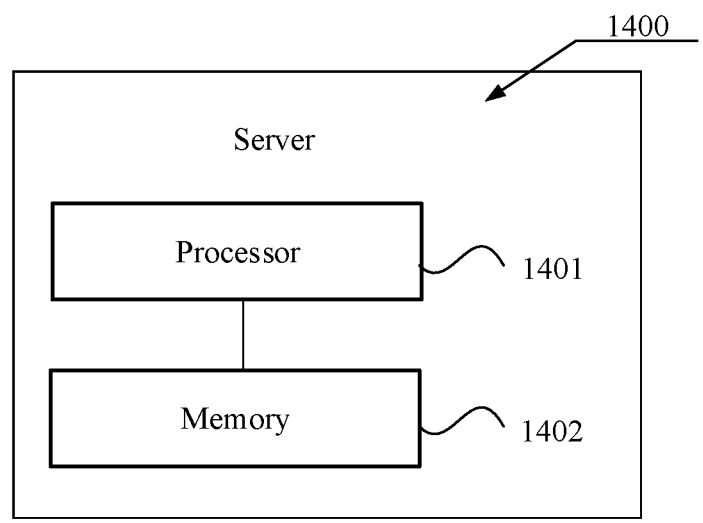
FIG. 14 is a schematic structural diagram of a server according to embodiment(s) of the present disclosure.

FIG. 14 is a schematic structural diagram of a server according to an embodiment of the present disclosure. The server 1400 may vary greatly because a configuration or performance varies, and may include one or more central processing units (CPU) 1401 and one or more memories 1402. The one or more memories 1402 store at least one piece of program code, and the at least one piece of program code is loaded and executed by the one or more processors 1401 to implement the methods provided in the various method embodiments. In certain embodiment(s), the server 1400 may also have a wired or wireless network interface, a keyboard, an input/output interface and other components to facilitate input/output. The server 1400 may also include other components for implementing device functions. Details are not described herein.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In an exemplary embodiment, a computer-readable storage medium, for example, a memory including at least one piece of program code is further provided. The at least one piece of program code may be executed by a processor to implement the user inviting method in the embodiments. For example, the computer-readable storage medium may be a read-only memory (ROM), a random access memory (RAM), a compact disc ROM (CD-ROM), a magnetic tape, a floppy disk, an optical data storage device, or the like.

A person of ordinary skill in the art may understand that all or some of the steps of the embodiments may be implemented by hardware, or may be implemented a program instructing related hardware. The program may be stored in a computer-readable storage medium. The storage medium may be: a ROM, a magnetic disk, or an optical disc.

The descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A user inviting method, performed by a terminal, the method comprising:
    obtaining a user identifier of a current login user, in response to a trigger operation for a target invitation link corresponding to a target two-dimensional code, the target two-dimensional code being encrypted by using a public key and used for indicating jump to a target invitation page;
    accessing the target invitation link based on the user identifier, and obtaining a private key corresponding to the public key in response to that the user identifier is consistent with a target user identifier corresponding to the target invitation link;
    decrypting the target two-dimensional code by using the private key, and displaying the target invitation page in response to that the target two-dimensional code is decrypted successfully; and
    submitting user information written to the target invitation page in response to a submitting operation for the target invitation page.

2. The method according to claim 1, wherein displaying the target invitation page comprises:
    displaying an application page in the target invitation page in response to that the target invitation page includes the application page and an information writing page; and
    displaying the information writing page in the target invitation page in response to a submitting request for the application page.

3. The method according to claim 1, further comprising:
    displaying an invitation card, the invitation card being associated with the target invitation link; and
    using a trigger operation for the invitation card as the trigger operation for the target invitation link in response to that the trigger operation for the invitation card is received.

4. The method according to claim 3, wherein displaying the target invitation page comprises:
    displaying the target invitation page and displaying an invitation code display area in the target invitation page; and
    obtaining a target invitation code from a card title of the invitation card, and writing the target invitation code into the invitation code display area of the target invitation page.

5. The method according to claim 1, wherein displaying the target invitation page comprises:
    displaying the target invitation page and displaying an invitation code display area in the target invitation page; and
    generating a target invitation code based on the private key, and writing the target invitation code into the invitation code display area of the target invitation page.

6. The method according to claim 1, further comprising:
    displaying a submitting success page, and detecting whether a target client is installed in the terminal currently.

7. The method according to claim 6, further comprising:
    displaying a download guide option on the submitting success page in response to detecting that the target client is not installed in the terminal, wherein the download guide option is used for guiding the user to download the target client.

8. The method according to claim 1, further comprising:
    transmitting a sharing request for the target two-dimensional code to a server.

9. A user inviting method, performed by a server, the method comprising:
    transmitting a target invitation link corresponding to a target two-dimensional code, the target two-dimensional code being encrypted by using a public key and used for indicating jump to a target invitation page;
    receiving an access request for the target invitation link, the access request carrying a user identifier;
    transmitting a private key corresponding to the public key in response to that the user identifier is consistent with a target user identifier corresponding to the target invitation link,
    the private key being used for decrypting the target two-dimensional code, to display the target invitation page in response to that the target two-dimensional code is decrypted successfully;
    obtaining user information written to the target invitation page in response to a submitting request for the target invitation page; and
    storing the user information in a blockchain based on a consensus mechanism.

10. The method according to claim 9, further comprising:
    generating the target two-dimensional code; and
    generating the target invitation link based on the target two-dimensional code in response to a sharing request for the target two-dimensional code.

11. The method according to claim 10, wherein generating the target invitation link comprises:
    obtaining the public key corresponding to the target two-dimensional code from an authentication platform in response to the sharing request for the target two-dimensional code;
    encrypting the target two-dimensional code by using the public key; and
    generating the target invitation link based on the encrypted target two-dimensional code.

12. The method according to claim 9, further comprising:
    performing user qualification approval based on a target condition and the user information, the target condition including data restriction information corresponding to the user information; and
    performing the operation of storing the user information in a blockchain in response to that the user qualification approval succeeds.

13. The method according to claim 9, wherein storing the user information comprises:
    obtaining a user identifier of an invitation initiating user;
    constructing target data based on the user identifier of the invitation initiating user and the user information; and
    storing the target information in the blockchain based on the consensus mechanism.

14. A user inviting apparatus, comprising: a memory storing computer program instructions; and a processor coupled to the memory and configured to execute the computer program instructions and perform:
    obtaining a user identifier of a current login user, in response to a trigger operation for a target invitation link corresponding to a target two-dimensional code, the target two-dimensional code being encrypted by using a public key and used for indicating jump to a target invitation page;

accessing the target invitation link based on the user identifier, and obtaining a private key corresponding to the public key in response to that the user identifier is consistent with a target user identifier corresponding to the target invitation link;

decrypting the target two-dimensional code by using the private key, and displaying the target invitation page in response to that the target two-dimensional code is decrypted successfully; and submitting user information written to the target invitation page in response to a submitting operation for the target invitation page.

15. The user inviting apparatus of claim 14, wherein displaying the target invitation page includes:

displaying an application page in the target invitation page in response to that the target invitation page includes the application page and an information writing page; and displaying the information writing page in the target invitation page in response to a submitting request for the application page.

16. The user inviting apparatus of claim 14, wherein the processor is further configured to execute the computer program instructions and perform:

displaying an invitation card, the invitation card being associated with the target invitation link; and using a trigger operation for the invitation card as the trigger operation for the target invitation link in response to that the trigger operation for the invitation card is received.

17. The user inviting apparatus of claim 16, wherein displaying the target invitation page includes:

displaying the target invitation page and displaying an invitation code display area in the target invitation page; and obtaining a target invitation code from a card title of the invitation card, and writing the target invitation code into the invitation code display area of the target invitation page.

18. The user inviting apparatus of claim 14, wherein displaying the target invitation page includes:

displaying the target invitation page and displaying an invitation code display area in the target invitation page; and generating a target invitation code based on the private key, and writing the target invitation code into the invitation code display area of the target invitation page.

19. The user inviting apparatus of claim 14, wherein the processor is further configured to execute the computer program instructions and perform:

displaying a submitting success page, and detecting whether a target client is installed in the terminal currently.

20. The user inviting apparatus of claim 14, wherein the processor is further configured to execute the computer program instructions and perform:

transmitting a sharing request for the target two-dimensional code to a server.

* * * * *